United States Patent
Kendall et al.

(10) Patent No.: US 6,852,422 B2
(45) Date of Patent: Feb. 8, 2005

(54) COMPOSITE PACKAGING MATERIALS AND PRINTABLE SHEETS, AND METHODS OF MAKING

(75) Inventors: David Paul Kendall, Appleton, WI (US); James Richard Hillend, Neenah, WI (US)

(73) Assignee: Appleton Papers, Inc., Appleton, WI (US)

( * ) Notice: Subject to any disclaimer, the term of this patent is extended or adjusted under 35 U.S.C. 154(b) by 162 days.

(21) Appl. No.: 10/173,289

(22) Filed: Jun. 17, 2002

(65) Prior Publication Data

US 2003/0232211 A1 Dec. 18, 2003

(51) Int. Cl.$^7$ .......................... B32B 23/08; B32B 23/02; B41M 5/00; B41M 5/40
(52) U.S. Cl. ................ 428/511; 428/32.18; 428/32.21; 428/32.26; 428/32.28; 428/32.34; 428/32.22; 428/402; 428/514
(58) Field of Search ................... 428/511, 514, 428/536, 375, 378, 402.2, 402.21, 402.22, 402.24, 403, 32.15, 32.18, 32.21, 32.25, 32.26, 32.28, 32.34, 327, 402, 32–22

(56) References Cited

U.S. PATENT DOCUMENTS

| | | |
|---|---|---|
| 3,600,166 A | 8/1971 | Sieg et al. |
| 4,946,372 A | 8/1990 | Avni ........................ 428/325 |
| 5,061,345 A | 10/1991 | Hoffman ................... 162/125 |
| 5,147,507 A | 9/1992 | Gill ........................... 162/158 |
| 5,185,062 A | 2/1993 | Begala ..................... 162/168.1 |
| 5,244,702 A | 9/1993 | Finestone et al. .......... 428/34.3 |
| 5,603,996 A | 2/1997 | Overcash et al. .......... 428/34.2 |
| 5,679,443 A | 10/1997 | Barrows et al. ............ 428/206 |
| 5,851,651 A * | 12/1998 | Chao ........................... 428/327 |
| 5,981,011 A | 11/1999 | Overcash et al. .......... 428/40.9 |
| 6,099,674 A | 8/2000 | Hoffman ..................... 156/217 |
| 6,117,563 A | 9/2000 | Watanabe et al. ......... 428/537.5 |
| 6,132,822 A | 10/2000 | Overcash et al. .......... 428/34.2 |
| 6,140,390 A * | 10/2000 | Bugner et al. ............... 523/160 |
| 6,187,389 B1 | 2/2001 | Overcash et al. ........... 427/488 |
| 6,193,831 B1 | 2/2001 | Overcash et al. ........... 156/230 |
| 6,346,333 B1 * | 2/2002 | Valentini et al. .......... 428/32.34 |
| 6,478,865 B1 * | 11/2002 | Malla et al. ................. 106/464 |

FOREIGN PATENT DOCUMENTS

JP          04219267 A  *  8/1992

OTHER PUBLICATIONS

"Product Information," Elvanol 90–50. DUPONT, 1998, 3 sheets.
"Product Information," Elvanol 70–06. DUPONT, 1998, 3 sheets.

* cited by examiner

Primary Examiner—D. S. Nakarani
Assistant Examiner—Kevin R. Kruer
(74) Attorney, Agent, or Firm—Wilhelm Law Service; Thomas D. Wilhelm

(57) ABSTRACT

Printable packaging paper for flexible packaging. A flexible overall print coating makes a first surface suitable for conventional printing. The print coating comprises clay, binder comprising acrylic and optionally PVOH, and microsphere shells, some optionally deformed. A barrier coating comprising PVOH, optionally acrylic, can be on the second surface. A multiple layer packaging structure can comprise such coated substrate and second and third strength layers of paper, and a flexible polyolefin barrier layer, all on the barrier coating side of the substrate, joined to the barrier coating. The flexible print coating can include titanium dioxide. The invention includes methods of making printing paper by applying first and second overlying acrylic or PVOH barrier coatings, calendaring the coated substrate in line, applying a flexible neutral-color print coating onto the first surface, including clay, binder comprising acrylic polymer, and polymeric microsphere shells, and calendaring the substrate a second time.

30 Claims, 2 Drawing Sheets

COMPOSITE PACKAGING MATERIALS AND PRINTABLE SHEETS, AND METHODS OF MAKING

BACKGROUND

This invention relates to composite packaging materials, typically multiple layer packaging materials. This invention further relates to certain coated sheets used in making such composite packaging materials, and methods of making such coated sheets and composite packaging materials.

A wide variety of generally dry particulate products are packaged typically in bulk quantities in multiple layer flexible packaging materials based primarily on paper, and optionally including one or more polymeric layers. Such multiple layer flexible packaging materials typically have a coated outer layer wherein the coating is suitable for receiving conventionally-available inks printed as graphics and other indicia of the product contained therein and wherein such outer layer is so-printed at such coating. Effective employment of the packaging requires effective maintenance of such printing on the outer surface of the package throughout the period when the product is contained therein. Effective employment of the packaging further requires that indicia and other images so printed on the outer surface of the packaging material not be substantially degraded by flexing of the packaging material during normal use of the packaging material in containing such product.

Dry particulate products typically packaged in packaging of the nature being addressed herein comprise a variety of contained liquidous components such as especially oils and water, as well as certain components which are potentially chemically reactive. Further, certain such products are also abrasive such that the packaging material must be sufficiently tough to not be deleteriously degraded by abrasion imparted by such contained products.

Any one such product may contain no such liquidous, chemically reactive, or abrasive components, may contain only one such component, or may contain multiple such components. Such liquidous components and chemically reactive components, along with any abrasive properties, hold potential for damaging certain elements of the packaging material if such elements of the packaging material are exposed to such components.

Examples of such dry particulate products are salt, sugar, dry pet foods which contain various oils, flour which contains grain oil, cement and grout which contain reactive calcium compounds, bird seed which contains various seed oils, and various grains which contain grain oils. In general, the size of the particles of the contained product is of little consequence to employment of the instant invention.

Typical packaging materials of interest in the invention are used to package product in bags which contain relatively larger quantities of at least 1 pound, but more commonly at least 4 pounds. Respectively stronger ones of packaging materials of interest in the invention are used to make bags which contain e.g. 25 pounds, 50 pounds, and up to 100 pounds or more of product.

A typical conventional packaging structure of the nature being addressed herein has a first outer layer of sheet material which contains printed indicia thereon, and at least one interior strength layer, which is typically an unbleached kraft paper layer. In many implementations, the packaging structure further comprises a polymeric, e.g. polyolefin, layer such as a polypropylene layer or a polyethylene layer disposed on the interior of the packaging structure. Typically, the kraft strength layer is between the outer layer and the polymeric layer. However, it is within the scope of the invention that the polymeric layer be between the kraft strength layer and the outer layer. Further, and especially where a relatively greater mass of product is to be contained in a bag, more than one strength layer can be used in the packaging structure, interiorly of the outer layer.

Such conventional structures are constructed such that substantially all of the strength of the packaging structure is provided by the kraft strength layer or layers. Modest contribution may be obtained from the polymeric layer. The outer graphics layer contributes essentially no net increment to strength of the packaging structure. In other words, the graphics layer could be deleted without substantial loss of strength of the packaging structure. However, such deletion would undesirably delete the graphics contribution of the outer graphic layer.

The graphics and/or printed indicia presentation on the outer surface of the outer layer serves multiple purposes. First, the printing can serve as a point-of-sale advertising medium. Second, the printing can be used to satisfy certain government regulations which require identification of certain attributes of the goods. In addition, the printing can serve to draw initial attention to the package. Thus, it is critical to both buyer and seller of such packaged goods that the printing remain intact, as printed, on the outer surface of the packaging structure at least throughout the period when the goods are contained in the package.

It is well known that such printing is readily degraded, in some cases rendered useless, by certain oils, for example vegetable and grain oils. For example, the oils present in commercially available dry dog food and dry cat food, inside a closed and sealed bag, can have damaging affect on the printing which is on the outside surface of the bag. Thus, it is known to provide certain barriers to transmission of such oils through the packaging material to the printed indicia and the coatings under the printed indicia. It is known, for example, to provide a layer of e.g. about 0.005 inch thick polyolefin such as polypropylene or polyethylene as the innermost layer of the packaging structure, namely as an interior surface layer at the cavity which contains the product. Such polyolefin layer serves as a first barrier to migration of such oils toward the print coating.

In order to ensure protection of the print coating, the substrate to be printed as the outer layer of the packaging material is typically saturated with fluorocarbon, wherein the fluorocarbon serves as a final barrier to migration of the oils toward the printed indicia as well as the underlying print coating. However, government regulations require that users discontinue such uses of fluorocarbon. Further, saturating the substrate with fluorocarbon uses a substantial quantity of the fluorocarbon barrier material. By comparison, a barrier material which is concentrated at the surface of the substrate layer, such as by a coating process, can potentially use less of the barrier material.

It would be desirable for the layer which provides the graphics presentation to also contribute to strength. Stated another way, it would be desirable to provide graphics capability to a strength layer. Stated still another way, it would be desirable to combine graphics and strength properties in a common layer, thereby saving the cost of using a layer, which contributes no substantial amount of the strength, for the purpose of presenting the graphics message. Namely, if the graphics message can be provided in a layer which also provides a substantial strength increment to the packaging structure, the quantity of paper used in the packaging structure can be reduced by the incremental amount of paper which would otherwise be used to present the graphics message.

Thus, it is an object of the invention to provide flexible packaging material for packaging bulk bagged product, especially particulate product, wherein the packaging material tolerates the use conditions of the packaged goods contained therein while improving cost efficiency of the packaging material.

It is a more specific object to provide packaging material which is flexible throughout its use for containing a product therein, while maintaining printed indicia thereon in good condition throughout the term of use of the package.

It is yet another object of the invention to provide flexible packaging structures wherein the printed indicia tolerates repeated flexing of the packaging material without damage to the printed indicia or the message conveyed by such indicia.

It is yet another object to provide packaging material having a novel second barrier to oil migration, on the reverse surface of the layer which bears the printed indicia.

Still another object of the invention is to provide a coated sheet material which has a surface suitably receptive to receiving conventional printing inks, and which is coated onto a substrate which provides substantial contribution toward the strength of the packaging material, and which can preferably serve as a primary strength layer.

A further object is to provide such coated sheet material wherein the substrate sheet which provides primary strength contribution, in combination with a suitable ink-receptive printing surface, is a sheet of unbleached kraft paper.

A yet more specific object is to provide such coated printable unbleached kraft paper wherein the suitably receptive surface is suitably white to meet conventional printing standards pertaining to suitability of a white surface onto which conventional colored inks can be effectively printed with reasonable expectation of desirable color and clarity presentations.

Yet another object is to provide, on relatively open and porous paper substrates, novel barrier coatings which can serve as a final barrier, in combination with an initial polyolefin film barrier layer, to migration of certain oils toward a print coating, thus to protect the print coating from the deleterious affect of the oil.

SUMMARY

A composite printable packaging paper for flexible packaging includes a kraft paper substrate. A flexible print coating covers a first surface of the substrate and makes the first surface suitable for conventional printing. The print coating comprises clay, binder comprising 30 to 100 weight percent acrylic and up to 70 weight percent PVOH wherein such PVOH copolymer is cross-linked, and microsphere shells, some optionally deformed. A barrier coating comprising PVOH, substantially fully hydrolyzed, and optionally acrylic polymer, is preferably on the second surface of the substrate. The multiple layer packaging structure can comprise second and optionally third strength layers of paper, as well as a flexible polyolefin layer. The second strength layer and the polypropylene layer are disposed on the opposing barrier coating side of the substrate from the print coating layer, and are joined to the substrate at the barrier coating. In some embodiments, the softwood fibers in the substrate are predominantly unbleached fibers. In other embodiments, the softwood fibers in the substrate are predominantly bleached fibers. The flexible print coating can further comprise at least 10 percent by weight titanium dioxide, especially where the substrate comprises predominantly unbleached fibers.

The invention further comprehends a method of making such printable packaging paper comprising applying first and second barrier coating layers comprising at least one of acrylic polymer and cross-linking polyvinyl alcohol, soft calendaring the coated substrate in line, subsequently applying a flexible neutral color print coating onto the opposing surface of the substrate, including clay, binder comprising acrylic polymer, and polymeric microsphere shells, and subsequently soft calendaring the coated substrate a second time, to make the composite printing paper suitable for conventional printing and for use in flexible packaging More specifically, in a first family of embodiments, the invention comprehends a composite printable packaging paper suitable for use in flexible packaging implementations. The composite printable packaging paper comprises a kraft paper substrate having a basis weight of about 25 pounds per 3000 square feet to about 70 pounds per 3000 square feet, fiber content of the kraft paper substrate comprising at least 80 percent by weight softwood fibers, the kraft paper substrate having a first surface on a first side thereof, and an opposing second surface on a second side thereof. The printable packaging paper further comprises, in combination, about 4 pounds per 3000 square feet to about 20 pounds per 3000 square feet of flexible print coating coated onto and covering the first surface so as to make the first surface suitable for receiving conventional printing inks. The flexible print coating has an outer surface disposed away from the first surface of the substrate, and comprises about 5 percent by weight to about 50 percent by weight clay, about 10 percent by weight to about 50 percent by weight binder, the binder comprising about 30 percent by weight to 100 percent by weight acrylic polymer and optionally up to about 70 percent by weight polyvinyl alcohol copolymer wherein such polyvinyl alcohol copolymer is cross-linked, and about 7 percent by weight to about 30 percent by weight polymeric microsphere shells.

Preferably, the kraft paper substrate comprises substantially 100 percent softwood fibers, and has a basis weight of about 30 pounds to about 50 pounds per 3000 square feet.

In preferred embodiments, the flexible print coating is present in an amount of about 6 to about 12 pounds per 3000 square feet.

In some embodiments the flexible print coating is a white coating, and comprises at least one material selected from the group consisting of white coating clay, calcium carbonate, and titanium dioxide.

In preferred embodiments, the binder comprises about 25 to about 45 percent by weight of the composition of the flexible print coating, and the acrylic polymer provides, to the printed substrate, resistance to greases and oils.

In especially preferred embodiments, the binder comprises the acrylic polymer in an amount of at least 80 percent by weight.

In highly preferred embodiments, a portion of the microsphere shells proximate the outer surface of the flexible printable white coating have been physically deformed from such microsphere shell structure.

In some embodiments, the flexible print coating comprises the polymeric microsphere shells in an amount of about 15 to about 25 percent by weight.

In highly preferred embodiments, the composite printable packaging paper further comprises a barrier coating, coated onto and covering the second surface, of about 2 pounds to about 12 pounds per 3000 square feet, more preferably about 5 pounds to about 10 pounds per 3000 square feet, and most preferably about 7 pounds to about 8 pounds per 3000 square feet, of a coating comprising polyvinyl alcohol, and including from about 20 percent by weight to about 60 percent by weight of an acrylic polymer, the polyvinyl alcohol being cross-linked, and preferably substantially fully hydrolyzed.

Preferably, the kraft paper substrate is substantially free from halogenated carbon material operable as an oil barrier.

In some embodiments, the composite printable packaging paper further comprises a barrier coating comprising a polyethylene film overlying and covering the second surface, and overcoated with about 1 pound per 3000 square feet to about 5 pounds per 3000 square feet, of polyvinyl alcohol.

In detailed summary, the invention comprehends a composite printable packaging paper as above wherein the kraft paper substrate has a basis weight of about 30 to about 50 pounds per 3000 square feet and comprises substantially 100 percent softwood fibers, wherein the flexible print coating is a white coating and is present in an amount of about 6 to about 12 pounds per 3000 square feet, wherein the binder comprises about 35 percent to about 45 percent by weight of the composition of the flexible printable white coating, wherein the binder comprises the acrylic polymer in amount of at least 90 percent by weight, wherein the flexible print coating comprises the microsphere shells in an amount of about 15 percent to about 25 percent by weight, wherein a portion of the microsphere shells proximate an outer surface of the flexible print coating have been physically deformed from such microsphere structure, the barrier coating being present in an amount of about 5 pounds to about 10 pounds per 3000 square feet, and the barrier coating comprising the acrylic polymer in an amount of about 45 percent to about 55 percent by weight of the barrier coating.

The multiple layer flexible packaging structure can further comprise a second layer of kraft paper having a basis weight such that the combined weight of the first and second layers is about 60 pounds to about 140 pounds per 3000 square feet, and further comprising a flexible polypropylene layer about 0.002 inch to about 0.015 inch thick, both the second layer and the polypropylene layer being disposed on the second side of the kraft paper substrate of the first layer, with said barrier coating between said kraft paper substrate and said second layer of kraft paper, and between said kraft paper substrate and said polypropylene layer In preferred embodiments of the invention, the barrier coating is effective to protect the flexible print coating from oil, up to at least a kit 7 test.

In some embodiments, the softwood fibers in the kraft paper substrate are predominantly unbleached fibers, and the flexible print coating further comprises at least 10 percent by weight titanium dioxide.

In a second family of embodiments, the invention comprehends a composite printable packaging paper. The composite packaging paper comprises a kraft paper substrate having a basis weight of about 25 pounds to about 70 pounds per 3000 square feet, fiber content of the kraft paper substrate comprising at least 80 percent by weight softwood fibers, the kraft paper substrate having a first surface on a first side thereof, and an opposing second surface on an opposing second side thereof; a print coating coated onto and covering the first surface so as to make the first surface acceptably receptive to conventional printing inks; and a barrier coating, coated onto and covering the second surface, of about 2 pounds to about 12 pounds per 3000 square feet of a coating comprising polyvinyl alcohol, and up to about 60 percent by weight of an acrylic polymer, the polyvinyl alcohol being cross-linked, the barrier coating being effective to protect the print coating from a variety of oil-based substances when such oil-based substances are in contact with the composite packaging paper at an outer surface of the barrier coating.

In preferred embodiments, the kraft paper substrate has a basis weight of about 30 pounds to about 50 pounds per 3000 square feet.

The barrier coating is preferably present in an amount of about 5 pounds to about 10 pounds per 3000 square feet.

In preferred embodiments, the barrier coating comprises the acrylic polymer in an amount of about 45 percent to about 55 percent by weight of the barrier coating.

In some embodiments, the barrier coating comprises a polyethylene film between the second surface of the kraft paper substrate and the barrier coating.

In preferred embodiments, the print coating is a white coating and comprises at least one material selected from the group consisting of white kaolin clay, calcium carbonate, and titanium dioxide.

The invention also comprehends a multiple layer flexible packaging structure comprising a composite printable packaging paper as above as a first layer, and further comprises a second layer of a kraft paper having a basis weight such that the combined weight of the first and second layers is about 60 pounds to about 140 pounds per 3000 square feet, and further comprises a flexible polypropylene layer about 0.002 inch to about 0.015 inch thick, both the second layer and the polypropylene layer being disposed on the second side of the kraft paper substrate of the first layer, with said barrier coating between said kraft paper substrate and said second layer of kraft paper, and between said kraft paper substrate and said polypropylene layer.

Some aspects of the invention comprehend a method of making a composite printing paper suitable for use in flexible packaging implementations, by coating a kraft paper substrate having a basis weight of about 25 pounds to about 70 pounds per 3000 square feet, fiber content of the kraft paper substrate comprising at least 80 percent by weight softwood fibers, the kraft paper substrate having first surface on a first side thereof, and an opposing second surface on an opposing second side thereof. The method comprises applying to the second surface of the kraft paper substrate a first barrier coating layer comprising at least one of polyvinyl alcohol and acrylic polymer, such polyvinyl alcohol in the first barrier coating layer being cross-linked; applying a second barrier coating layer comprising polyvinyl alcohol over the first barrier coating layer, the second barrier coating layer being cross-linked; soft calendaring the so-coated substrate in line in a soft calendar stack comprising a first calendar roll having a metal working surface and a second calendar roll having a resilient polymeric surface layer, the first calendar roll, having the metal working surface, being disposed against the second barrier coating layer; subsequent to the soft calendaring, applying a flexible print coating composition onto and covering the first surface of the kraft paper substrate and thereby applying a flexible print coating thereto, the flexible print coating composition comprising clay, binder comprising acrylic polymer, and polymeric microsphere shells; and subsequent to applying the flexible print coating composition, soft calendaring the coated paper substrate a second time with the metal working surface against the second barrier coating layer, thereby to make the composite printing paper suitable for use in flexible packaging implementations, and suitable for receiving conventional printing inks.

In preferred methods, the first barrier coating layer has a first dry coating weight, the method further comprising applying the second barrier coating at a substantially lesser coating weight, on a dry weight basis, than the first barrier coating.

In preferred embodiments, the kraft paper substrate has a basis weight of about 30 pounds to about 50 pounds per 3000 square feet, the flexible print coating is present in an amount of about 6 pounds to about 12 pounds per 3000 square feet, the binder comprises about 35 percent to about 45 percent by weight of the composition of the flexible print coating, the binder comprises the acrylic polymer in amount of at least 90 percent by weight, and the polymeric microsphere shells comprise about 15 percent to about 25 percent by weight of the composition of the flexible print coating.

Preferred methods of the invention include physically deforming, namely rupturing, a portion of the microsphere shells proximate an outer surface of the flexible print coating, preferably during a soft calendaring step.

Figure 1:
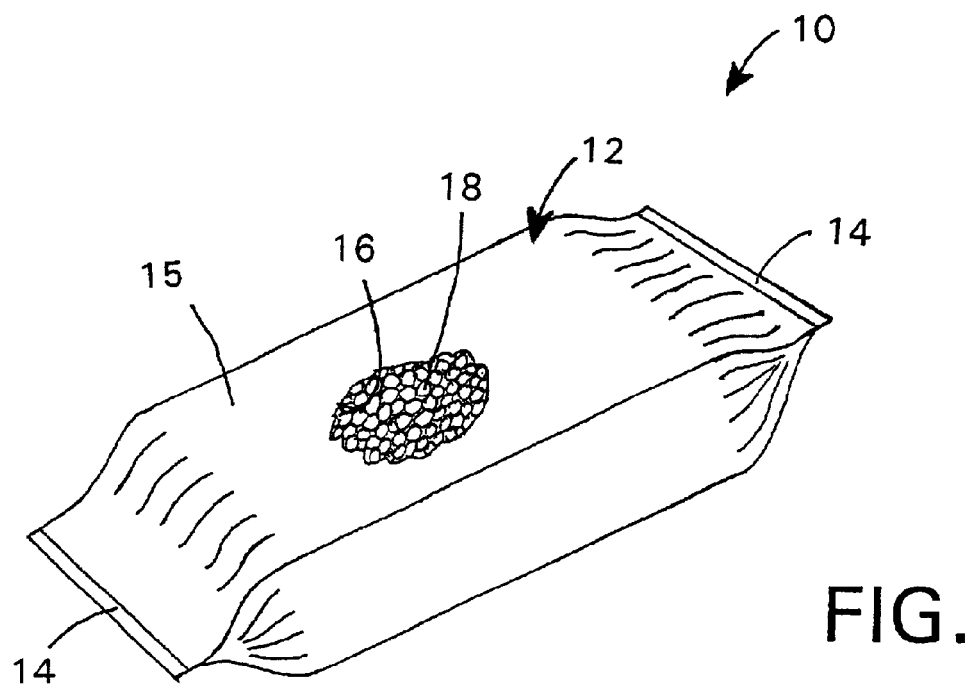
FIG. 1 shows a pictorial view of a bag which can be made with packaging materials of the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components with prefix numerals indicating figure numbers in FIGS. 2–5.

DESCRIPTION OF THE ILLUSTRATED EMBODIMENTS

Turning now to the drawings, FIG. 1 illustrates generally a bag 10 of the type of interest in the invention. Bag 10 has a main body 12 and opposing end seals 14 on opposing ends of the main body, and an outer surface 15. The main body and end seals collectively define an inner cavity 16 in the bag. A product such as particulate dry dog food 18 is contained in cavity 16.

Figure 2:
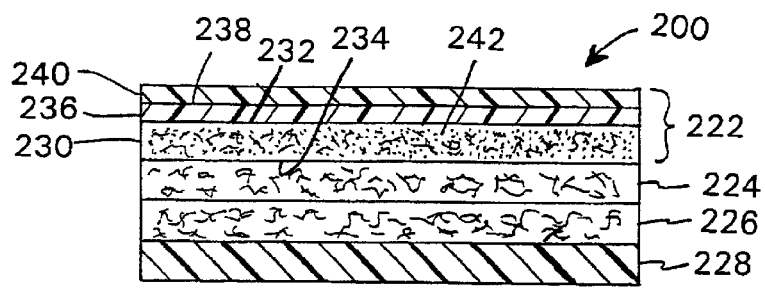
FIG. 2 shows a cross-section of a prior art multiple layer packaging material.

FIG. 2 shows a cross-section of prior art packaging structure 200 which has been used in fabricating bags such as bag 10. Such packaging structure 200 has an outer graphics layer 222 which generally provides, as its outer surface, the outer surface 15 of the bag. A first strength layer 224 is positioned adjacent graphics layer 222 and inwardly in the bag from graphics layer 222. An optional second strength layer 226 is positioned adjacent first strength layer 224 and inwardly in the bag from the first strength layer. A polypropylene barrier layer 228 is positioned adjacent second strength layer 226 and inwardly in the bag from the second strength layer.

Graphics layer 222 comprises a paper substrate layer 230 having opposing first 232 and second 234 surfaces. A print coating 236 is disposed on first surface 232, and modifies the first surface suitably to provide a printable surface 238 on the print coating, for receiving conventionally available printing inks, thus to provide graphics desired for representing the contained product. Layer 240 represents the printed image. Substrate layer 230 is impregnated with fluorocarbon as indicated by the stippling 242 of layer 230 in FIG. 2.

Substrate layer 230 of outer graphics layer 222 typically has a basis weight of about 35 to 40 pounds per 3000 square feet. Similarly, strength layers 224 and 226 also typically have basis weights of about 40 pounds per 3000 square feet.

Substrate layer 230 is generally comprised, in significant fraction, of hardwood fibers, since such hardwood fibers generally can be made into paper sheets which provide a relatively more desirable printing surface, or a surface which can readily be coated to provide a desirable printing surface. Such substrate typically contains about 40 percent by weight to about 60 percent by weight hardwood fibers and conversely about 60 percent by weight to about 40 percent by weight softwood fibers. By contrast, strength layers 224 and 226 are typically unbleached softwood kraft webs because softwood kraft fibers are known as a cost efficient source of strength in a paper web, and unbleached such fibers are approximately as strong as bleached fibers while being less costly.

However, because layer 230 is comprised significantly of hardwood fibers, layer 230 makes no substantial incremental contribution to strength of the bag.

Figure 3:
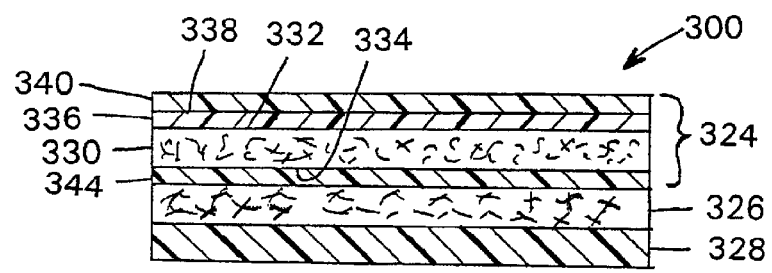
FIG. 3 shows a cross-section of a first embodiment of multiple layer packaging materials of the invention.

FIG. 3 shows a cross-section of a first embodiment of packaging structures 300 of the invention. Packaging structure 300 has, as an outer layer at outer surface 15, a first strength layer 324 coated two sides, which provides substantial strength contribution to the bag, and which first strength layer has been suitably modified to provide a desirable, suitable printing surface for receiving graphics thereon. A second strength layer 326 is positioned adjacent first strength layer 324 and inwardly in the bag from the first strength layer. A polyolefin barrier layer 328 is positioned adjacent second strength layer 326 and inwardly in the bag from the second strength layer.

Still referring to FIG. 3, first strength layer 324 comprises a kraft paper substrate web 330 having opposing first 332 and second 334 surfaces. A print coating 336 is disposed on first surface 332 and modifies the first surface suitably to provide a printable surface 338 on the print coating, for receiving conventionally available printing inks, thus to provide graphics desired for representing the contained product. Layer 340 represents the printed image.

Contrary to the prior art, in the embodiment of FIG. 3, the printed substrate is not impregnated with a fluorocarbon barrier material, or any other halogenated-carbon combination material as a barrier material. By contrast, a polymer barrier layer 344 is coated onto the second surface 334 of substrate web 330, thereby to provide a barrier coating free from fluorocarbon moieties. By applying a coating of the barrier material concentrated at the surface of the substrate web, rather than impregnating the barrier material through the entire thickness of the substrate web, potentially less of the coating material can be used than would otherwise be required to develop the same level of barrier by an impregnation process, depending at least in part on the porosity and density of the substrate layer as well as depending on viscosity and other physical properties of the coating material.

The sheet material used as substrate web 330 for first strength layer 324 is a kraft paper sheet or web. In that regard, the fiber content of substrate web 330 is at least 80 percent by weight softwood kraft fibers and no more than 20 percent by weight hardwood fibers. The composition of substrate web 330 can have any softwood kraft fraction at or above 80 percent by weight, up to 100 percent softwood kraft. In general, the higher the softwood kraft fraction, the greater the strength of the layer. Accordingly, 100 percent softwood kraft is preferred for the fiber content of web 330.

The difficulty in providing such a strength layer as the outer layer of the packaging structure is that, although the relative strength of softwood kraft layers is known, the matte structure of softwood kraft webs is known to be open, porous, coarse, and relatively rough textured. By contrast, a commercial quality print job, suitable for routine use in packages containing consumer goods, requires a relatively closed and relatively smooth surface, thus to enable printing of satisfactory graphics representations on the paper substrate, which graphic representations can be attractive to a potential purchaser of the goods. However, to applicants' knowledge, there is no conventionally known print coating, as at layer 336, and no known coating process, which can be cost effectively applied to such kraft substrates thereby to modify such open, porous, coarse, relatively rough textured structure of the kraft substrate so as to render the resulting coated surface suitably printable for the above noted users.

It is known to apply latex-based print coatings to kraft paper in order to make a printable surface. However, such latex-based print coatings are known to crack, and/or to peel from the substrate, when the packaging material is repeatedly flexed such as in making a bag, and using the bag to contain a bulk product through distribution and use of the product. Further, such known latex-based print coatings do not have suitable hiding qualities to provide an acceptably neutral, e.g. white, base color for printing purposes, and which suitably hides the brown color inherent in unbleached softwood kraft webs. In addition, latex-based print coatings are known to turn yellow over the life of use of some packaging products.

In embodiments where substrate web 330 comprises predominantly unbleached kraft fibers, the resultant paper web is brown, whereby special care must be taken to hide the brown color thereby to obtain a neutral color printing surface. Where a white printing surface is desired, as is usually the case, the conventional knowledge for providing a white surface is to employ a substantial fraction of titanium dioxide in the print coating composition. However, titanium dioxide is known to fracture along the lines of the platelet-like particles inherent in titanium dioxide when such print coatings are flexed as in making a bag. Accordingly, conventional print coatings known to the inventors herein, which incorporate one or both of latex and titanium dioxide, result in fracture of the printed image at print coating 336 when the resulting packaging material is flexed.

Thus, one aspect of the invention revolves about the objective of providing, on a kraft paper web, a printable surface suitably smooth to receive conventional printing inks while presenting an acceptable quality resultant printed graphics image which is capable of hiding the brown color of the unbleached softwood kraft fibers, and presenting a neutral color printing surface. Thus, the invention further revolves about the objective of selecting a color agent for use in the printable print coating, whereby the print coating renders the resultant coated surface so fully in control of color as to obscure any non-white color in the kraft fibers and/or elements of the kraft web to such extent that the substrate is a non-issue with respect to being able to obtain a printed outer surface which is equivalent to the high quality of graphics required in packaging materials used in mass distributed merchandise.

Accordingly, an objective of the invention is to provide a coated substrate which presents a printable surface of such quality that the printing cost increment related to preparing such surface and printing on such surface is less than any cost saved by the elimination of a graphics-only substrate layer such as layer 230. At the same time, the most cost effective embodiments of the invention eliminate, and do not replicate, the conventional graphics layer 230, with attendant savings associated with such layer elimination, while providing the graphics function on the outer strength layer, e.g. layer 330.

Preferably, there is no added cost in printing on outer strength layer 330, e.g. over the cost of printing on layer 230, or at least any added cost is deminimus. While it is acceptable in the invention to use a wide variety of inks, the cost of such inks or the cost of application of such inks, in combination with the other changes being made to the packaging material should, in combination, represent an overall cost savings to the packaging material user.

Referring again to FIG. 3, the fibers used in substrate layer 330 are for example 100 percent softwood kraft fibers, thus to maximize strength of a given basis weight web. Reduction in the softwood kraft fiber fraction in favor or hardwood fibers typically results in a corresponding reduction in the strength properties of the layer. However, it is acceptable in some embodiments of the invention to use lesser fractions of kraft fiber. Nonetheless, in those embodiments which eliminate the graphics-only layer, the substrate web used as the printing layer must be sufficiently strong to provide a primary strength increment to the resultant packaging structure. To that end, the fiber content of substrate layer 330 must in all embodiments be at least 80 percent by weight, and is preferably at least 90 percent by weight, softwood kraft fibers.

The Print Coating

The inventors herein have discovered novel compositions for print coating 336 which can provide suitable colorant for covering even the brown color of conventional unbleached kraft sheets, while providing sufficient flexibility in the print coating that the packaging material made using such coated substrate can be flexed without deleterious affect on the appearance of the indicia printed thereon.

In the alternative, the family of novel print coating compositions disclosed herein for layer 336 can be beneficially employed with bleached kraft substrate webs. In addition, the novel print coating compositions of the invention can also be beneficially used in some instances with hardwood-based substrate webs in order to improve flex cracking resistance of the resultant printed web, albeit without the incremental strength contributions of softwood-based substrate webs.

In that regard, print coating 336 includes about 5 percent by weight to about 50 percent by weight clay, about 10 percent by weight to about 50 percent by weight binder, and about 7 percent by weight to about 30 percent by weight polymeric microsphere shells. Certain other components can be added as desired for specific purposes. The specific percentages selected for each of such components is influenced at least in part by the properties of the substrate web to which such print coating is to be applied.

The clay particles act as a filler, and contribute substantially to hiding the brown color of unbleached softwood kraft fibers, as well as to imparting a neutral white color to the surface of the resultant print coating.

Critical to the binder is that the composition of the binder comprises at least about 30 percent by weight up to 100 percent by weight acrylic polymer, and from zero up to about 70 percent by weight polyvinyl alcohol copolymer. Both the acrylic polymer and the polyvinyl alcohol have been found to provide desirable flex properties to the print coating layer, such that, when the packaging material is flexed, neither the printed graphic nor the print coating cracks. In addition, at least the polyvinyl alcohol, where used, provides a level of oil and water barrier to protect the overlying print layer from underlying oils and moisture. To the extent the polyvinyl alcohol is used, such polyvinyl alcohol is cross-linked.

In a first example of the print coating, a composition of the coating, suitable for use with a bleached kraft substrate web, is as follows, all in percent by weight.

Single Pass Print Coating for Bleached Kraft Substrate

38% acrylic binder

25% white kaolin clay

15% calcined clay

20% polymeric microsphere shells

A suitable acrylic binder is available from Rohm and Haas Company, Philadelphia, Pa., as P308® coating grade polymer. Suitable microsphere shells are available from Rohm and Haas Company as AF-1055 as styrene acrylic shells. The calcined clay is ANSILEX 93® from Engelhard Minerals and Chemicals Company, Iselin, N.J.

The above coating can be applied as an aqueous suspension. An application of about 10 pounds dry weight per 3000 square feet has been found to provide a highly suitable white printing surface on an otherwise conventional 40 pound per ream bleached kraft substrate from Longview Fibre Company, Longview, Wash., containing 100 percent bleached softwood kraft fibers.

In a second example of coated substrates, substrate web 330 comprises 100 percent unbleached softwood kraft fibers. In this example, two applications of coating material are preferably applied to surface 332 of the substrate web in developing print coating 336, thus to effectively hide the brown color of the unbleached substrate, and thereby to provide a highly suitable white printing surface on an otherwise conventional 40 pound per ream unbleached kraft substrate web containing 100 percent unbleached softwood kraft fibers.

Where hiding the brown color of unbleached kraft fibers is required, an example of a suitable first application, or primer coat, has the following composition, all in percent by weight.

Primer Application of Print Coating Material for Unbleached Kraft Substrate

67% calcium carbonate

10% kaolin clay

9% acrylic binder

7% titanium dioxide

5% polyvinyl alcohol binder, plasticized and cross-linked

2% viscosity control agents and other processing aids

The acrylic binder in the example primer is again the P308® from Rohm and Haas. The calcium carbonate is ALBAGLOS® from Eastman Chemical Company, Philadelphia, Pa. The polyvinyl alcohol in the example primer is CELVOL 325® from Celanese Chemicals, Dallas, Tex. The CELVOL® alcohol has a number of desirable properties. First, CELVOL® is substantially fully hydrolyzed. Applicants have found that fully hydrolyzed polyvinyl alcohols, e.g. preferably at least about 97 mole percent hydrolyzed alcohols, are preferred in order to avoid adding defoaming agents in the coating process, it having been found that defoaming agents in general are undesirable because print coating layers made with known foaming agents are brittle. Accordingly, any degree of hydrolysis, above at least 90 mole percent, wherein the polyvinyl alcohol can be incorporated into the coating composition without use of defoaming agents is acceptable for use in print coating layer 336.

Other polyvinyl alcohols can be used, with attendant minor adjustments in the overall composition and process of applying print coating 336 to accommodate minor differences among the respective polyvinyl alcohols. In light of the disclosure herein, those of ordinary skill in the art will be able to make such minor adjustments in accord with routine engineering choices.

Whichever polyvinyl alcohol is used, the polyvinyl alcohol is cross-linked by adding about 3% dry weight, based on dry weight of the polyvinyl alcohol, of a cross-linking agent such as an ethylene glycol. A suitable ethylene glycol is GLYOXAL 40® which is available from Dow Chemical Company, Midland, Mich. Further, the polyvinyl alcohol is plasticized by adding any of a wide variety of known plasticizing agents in an amount of about 0.3 percent by weight to about 0.8 percent by weight, preferably about 0.6 percent by weight plasticizer, based on the weight of the polyvinyl alcohol. Examples of suitable such plasticizers are, without limitation, polyethylene glycol, glycerine, and various of the Carbowaxes, such as CARBOWAX PEG 400® and CARBOWAX PEG 600®, both available from Dow Chemical Company, Midland, Mich. The same plasticizers and cross-linkers can be used for the following described barrier layer compositions on surface e.g. 334 of the substrate.

After applying the first application of coating material to the unbleached kraft substrate, the second application of coating material is applied as a finish application of print coating material over the primer application of print coating material. While less expensive calcium carbonate is used as a whitener in the primer application of print coating 336, titanium dioxide is preferred as the whitener of choice in the finish application of print coating material. A suitable exemplary finish coating material has the following composition, all by dry weight percent.

Finish Application of Print Coating Material for Unbleached Kraft Substrate

62% titanium dioxide

18% polymeric microsphere shells AF-1055

15% P308® acrylic binder 2.5% CELVOL 325 polyvinyl alcohol binder plasticized and cross-linked 2.5% alginate viscosity control agents, and other processing aids Both the primer application and the finish application of the print coating are applied at rates of about 5 pounds per 3000 square feet dry weight. Depending on the coarseness of the kraft substrate being coated, the substrate can be soft calendared after the first, or primer, application, with the soft side of the calendar stack against the primer material.

The above coating compositions, both for bleached kraft fiber webs and unbleached kraft fiber webs, were coated onto corresponding kraft substrate webs from Longview Fibre Company. It is well known in the art that kraft substrate webs from Longview Fibre Company correspond to relatively less porous, and relatively less coarse, grades of kraft substrates. Relatively coarser, more porous, substrates can be used so long as suitable adjustments are made in the process to present a suitable printing surface for print layer 340.

As an alternate type of substrate web, a combination of bleached and unbleached fibers can be used, thereby providing an attendant reduction in the requirement for hiding the brown fiber color.

The print coating need not be white, as other neutral background colors can be provided. Typically, though, for ease of color control during the printing process, the coating will include a substantial fraction of a white colorant in order to provide a neutral white color background onto which other colors can be printed. What is critical to the print coating is that a suitable amount of a plasticized binder be used in order to provide suitable adhesion to the underlying substrate, and to provide sufficient flexibility that the coating does not crack when the packaging material made with such coated and printed sheet is flexed, during routine use of such packaging material. In that regard, the binder in a given print coating application can in some embodiments be as low as 10 percent by weight, especially where two applications of print coating material are applied. Where two applications of print coating material are applied in developing print coating 336, the coating composition is preferably about 10 percent by weight to about 25 percent by weight binder. More preferred binder content is about 14 percent by weight to about 20 percent by weight. In the above example of primer and finish coating applications, and where equal quantities of both coating compositions are applied, the binder fraction is about 16 percent by weight of the resultant layer 336.

Where a single application of print coating material is applied in developing print coating 336, the binder content is typically higher, and is preferably about 30 percent by weight to about 50 percent by weight of the dried composition of the print coating. More preferred binder content is about 35 percent by weight to about 42 percent by weight binder. In the above illustrated example, binder fraction is 38 percent by weight.

Whether layer 336 is developed using a single coating application, or two or more coating applications, the binder includes at least 30 percent by weight acrylic polymer. While the above-noted P308® polymer is preferred, other acrylic polymers can as well be used. Where a single application of print coating material is used in developing print coating 336, higher levels of acrylic polymer are typically used in the binder composition. In such embodiments, at least 70 percent of the binder composition is acrylic, and preferably at least 90 percent of the binder is acrylic. Most preferably, the polymer content of the binder, in a single-application print coating, is 100 percent acrylic.

The print coating layer e.g. 336 typically covers the entirety of outer surface 332 of the substrate web, whereby elements of print layer 340 can be deposited anywhere over the projected area of outer surface 332 of the substrate web and be in surface-to-surface contact with print coating layer 336. Accordingly, print layer 340 can be continuous, covering the entirety of the print coating, e.g. 336, or can be discontinuous, applied over less than all of the outer surface of the print coating.

The Barrier Coating

Barrier layer 344 is preferably applied in two or more passes through a multiple-pass coater in order to provide sufficient coating weight to achieve a good oil and grease barrier. Where two or more such applications of coating material are applied to surface 334 of substrate we 330, the compositions of the applications can be tailored to be different from each other, respectively. To that end, the composition for the first pass should be more viscous and should apply a relatively greater quantity of the coating material, thus to better fill the largest pores in the surface of the substrate web. The composition of the final pass can then be less viscous to better flow into the remaining smaller pores, and not apply as much material mass. The compositions of any intervening layers can be selected respectively for intervening levels of coating weight and flowability. A suitable composition for use as a first layer is a combination of about 10 percent by dry weight to about 90 percent by dry weight polyvinyl alcohol copolymer and conversely about 90 percent by dry weight to about 10 percent dry weight of an acrylic polymer, both based only on the weight of the polymer. The polyvinyl alcohol is preferred for its oil and grease resistance, but is limited in terms of the solids content which can be carried in an aqueous coating liquid. The acrylic polymer provides some oil and grease resistance and further can be processed into an aqueous liquid coating at relatively higher solids content. The combinations of polyvinyl alcohol and acrylic, over the full extent of the above mentioned range of coatings thus provides the user with a wide variety of compositions from which to select, based on the specifics of e.g. matte structure and fiber content of the specific substrate to be coated.

An exemplary first coating composition to be applied to back surface 334 of a typical substrate is as follows, all percents being by weight.

First Pass Barrier Coating Composition

50% Elvanol 70-06® polyvinyl alcohol (19% solids), based on total polymer content 50% P308® acrylic polymer (34% solids), based on total polymer content 0.6% polyethylene glycol plasticizer, based on total solids 0.3% ethylene glycol cross-linker, based on total solids The coating composition is prepared by making slurries of the polyvinyl alcohol and the acrylic polymer, and heating the resulting slurries, with mixing, to temperatures sufficient to bring the solids particles into stable solutions. A typical final temperature for such heating is about 170 degrees C. to about 180 degrees C. The plasticizer is added to the mix tanks during the heating process. Cross-linker is preferably added to the mixture at the final mix tank, after the primary heating has been completed.

In the first pass coating, the acrylic polymer provides both filler and oil/grease barrier properties, while the Elvanol 70-06 provides the primary film-forming properties.

A preferred second pass barrier coating composition is 100% ELVANOL 90-50 polymer, also from DuPont Company, Wilmington, Del., with the same plasticizer and cross-linker as in the primer coat or coats. The first pass coating is applied at a coating weight of about 5 pounds dry per 3000 square feet, and provides, at a relatively lower viscosity, the bulk filling property required of a barrier coating. The second pass coating is applied at a coating weight of about 2.5 pounds per 3000 square feet. The Elvanol 90-50, though a relatively higher viscosity, is preferred for the second pass in order to provide a more continuous barrier film, better filling the small pores and other interstices in e.g. substrate web 330.

Use of the ELVANOL 70-06 polyvinyl alcohol, from DuPont Company, Wilmington, Del., provides relatively lesser desired viscosity and increased solids to the first application of the coating process, whereby a relatively greater coating weight can be applied in the first coating pass, thereby better filling pores in substrate we 330.

Minor quantities of additives and processing aids, as well as modifiers which do not affect the barrier properties of the polyvinyl alcohol and acrylic polymers can be included in the compositions for either of the respective barrier coating passes. Further, greater or lesser quantities of the barrier materials can be employed where porosity or coarseness of the respective substrate web to be coated varies.

In some instances, it may be desirable to use a mixture of polyvinyl alcohols such as a blend of Elvanol 90-50 and 70-06 in order to reduce the viscosity and thereby increase the weight of the coating applied in the second pass.

Coated Substrate Example 1

A Longview Fibre substrate we 330 having a basis weight of nominally 30 pounds per 3000 square feet is coated on a first surface 332 with 10 pounds per ream of the above-described Single Pass Print Coating Composition. The substrate web is coated on the opposite surface 334 with 2 passes (1 each) of the above 2 barrier coating compositions. The first pass applies about 5 pounds dry weight per 3000 square feet. The second pass applies about 2.5 pounds dry weight per 3000 square feet. The resulting coated layer is then printed with inks on the print coat layer 336 using conventional 4-color commercial printing techniques.

The resulting layer 324, coated both sides and printed on the print coating side is flexible, and can be flexed repeatedly through a typical use life of such packaging structure without flex cracking or peeling. In addition, the so-coated and printed layer provides good barrier to transmission of a variety of oils. The oil barrier test is conducted as follows.

Commercially available oil test kits are available from 3M Company, St. Paul, Minn., as 3M KIT TEST. In each kit, a series of 12 test compositions numbered 1–12, are provided. Test composition 1 contains a relatively greater fraction of an oil composition and a relatively lesser fraction of a solvent composition. Each increasingly greater test composition number contains a lesser fraction of the oil composition and a correspondingly greater fraction of the solvent composition until, at composition 12, the solvent fraction is highest and the oil fraction is lowest. The high level of solvent in composition 12 makes the kit 12 test most demanding on the packaging material to be tested while the kit 1 test is least demanding. The intermediate number tests impose relatively intermediate test demands on the coated substrate.

In the test procedure, a sample of the coated sheet material to be tested is placed on a suitable flat surface with the barrier layer 344 oriented upwardly. A drop of each of the oil-solvent test compositions of interest is placed on the barrier layer side 344 of the sample, along with suitable test material identification, at respective spaced locations representative of the material properties to be tested, and left on the sample for 15 seconds The test compositions are then carefully removed from the sample, and the test locations inspected for discoloration on both the surface of coating 344 and on the opposing printed surface.

In another test procedure, a folded edge of a so-coated layer 334 sheet is tested in the same manner as the previous flat sheet, and is left for 15 seconds. The sample is then removed from the test kit composition and excess test material removed. The folded section of the tested sheet is then inspected for wicking, as evidenced by any discoloration.

The highest test composition number, for which no discoloration is detected, is recorded to indicate the degree of success of the barrier material in blocking oil transmission. Thus, where composition 7 did not discolor the sample, but composition 8 did leave discoloration, the sample would be rated a "kit 7" sample, or a "kit 7" test result.

Manufacturers typically require a kit 7 test result when test material is placed in drops on the barrier surface, in order to consider a packaging material suitably resistant to oils.

The above described printed layer 324 exhibited a kit 11 test result when drops were placed on the barrier surface, and kit 7 on the folded section test. Higher or lower kit tests can be obtained by increasing or decreasing the quantity of barrier coating material used, or by using other polyvinyl alcohols having respective different barrier properties.

An alternative construction to barrier layer 344 can comprise a combination of polyethylene film overcoated with polyvinyl alcohol. For example, layer 330 can be e.g. extrusion coated or adhesively laminated with a film of e.g. about 0.001 inch to about 0.005 inch, preferably about 0.002 inch to about 0.003 inch, of low density polyethylene. The low density polyethylene is then solution coated with about 1 pound per 3000 square feet to about 5 pounds per 3000 square feet, preferably about 2 pounds per 3000 square feet to about 3 pounds per 3000 square feet, of the ELVANOL 90-50 polyvinyl alcohol.

The polyethylene film provides a basic barrier coating foundation concentrated at the surface of the substrate web. The polyvinyl alcohol solution fills minor voids in the surface of the polyethylene film, and provides a generally pin-hole-free protective covering over the polyethylene, thus to complete development of the effective barrier. A strength layer 324 having such barrier coating 340 made with such polyethylene film and overcoated with polyvinyl alcohol as described provides a kit 12 test result when test material drops are placed on the barrier surface.

Figure 4:
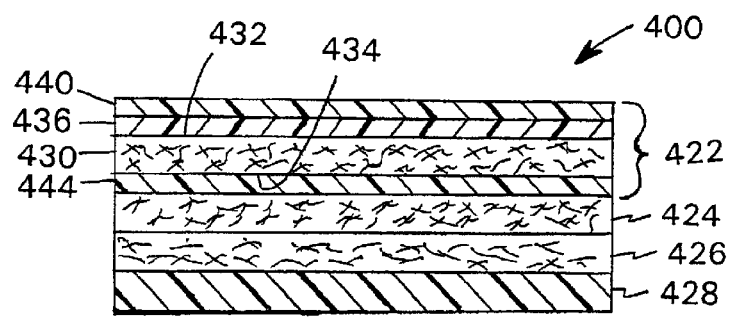
FIG. 4 shows a cross-section of a second embodiment of multiple layer packaging materials of the invention.

Turning now to FIG. 4, and structure 400 disclosed thereat, the principles discussed above can be applied to a conventional packaging structure as in FIG. 2 wherein a non-kraft, e.g. non-strength, substrate layer 430 is used as the layer bearing the graphics image. In such structure, the print coating e.g. 236 of FIG. 2 of the prior art has been replaced with a print coating 436 of the invention based on acrylic binder and polymeric microsphere shells, which serves as a base for receiving the print layer 440. Such replacement of the print coating composition provides flex crack resistance to the resultant outer composite graphics layer 422. Such packaging material can be further improved, or in the alternative solely improved, by replacing the impregnated fluorocarbon barrier material with a coating 444 of the barrier material of the invention containing polyvinyl alcohol and preferably acrylic polymer.

Thus, FIG. 4 illustrates a packaging material wherein the graphics-only print layer 422 of the prior art has been retained, but wherein the coatings on one or both surfaces 432, 434 have been upgraded by use of coatings 436, 444 disclosed herein at 336 and 344 with respect to FIG. 3. In such case, the cost savings, if any, compared to structure 200, are minimal because such structure uses 3 paper layers of about 40 pounds per 3000 square feet each, whereas the structure of FIG. 3 uses only 2 such paper layers. However, such structure 400 is improved in that flex crack resistance has been improved and the environmentally-offensive fluorocarbon material has been deleted while a suitable barrier to oil penetration has been provided.

Figure 5:
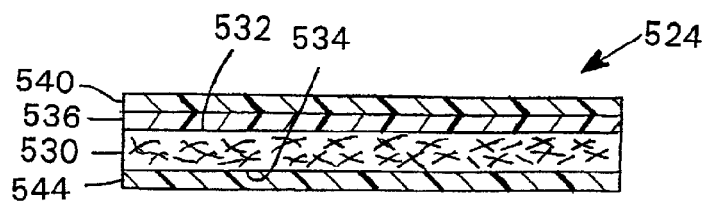
FIG. 5 shows a cross-section of a coated composite printable sheet of the invention.

FIG. 5 illustrates the composite coated sheet 524 of the invention which is illustrated in FIG. 3 as 324. Sheet 524 includes a softwood kraft substrate web 530, which can be bleached or unbleached softwood kraft, or any combination of bleached or unbleached softwood kraft, which includes up to 20 percent by weight hardwood fiber. Sheet 524 further has the above identified print coating of the invention at surface 532, the print coating being designated 536 in FIG. 5. Print layer 540 is printed onto print coating 536. A barrier layer based on polyvinyl alcohol and acrylic polymers, or polyethylene film overcoated with polyvinyl alcohol, is indicated at 544 in FIG. 5.

Sheet 524 has utility in its own right as a packaging material, so long as suitable sealants are provided for making seals 14 or like closure of the bags made therefrom. However, for purposes of providing strength, and a wide range of utilities to the packaging structure, a second strength layer as at 326 is preferably provided, along with a first polymeric barrier layer as at 328.

The various coatings discussed herein can be applied by a variety of known coating processes such as roll coating, wire rod coating, knife coating, and the like. All conventional coating processes are contemplated for use with the invention. In all such cases, the coating materials are preferably suspended in an aqueous carrier medium, which is dried from the coating after the coating is applied to the substrate or other underlying surface.

A variety of structures have been disclosed herein in describing the various packaging structures illustrated. Such structures have in common at least the coated substrate coated on the first side with a print coating, comprising an acrylic polymer and polymeric microsphere shells, and a printing layer; and coated on the opposing side with a barrier layer comprising polyvinyl alcohol and acrylic polymer. To the extent other layers are included in a respective packaging material such as additional strength layers and/or a polymeric barrier layer, such layers can be attached in full surface-to-surface adhesion; but are more commonly joined to each other at spaced locations about the facing surfaces of the respective layers. In some embodiments, one or more of the layers are joined to each other only at or adjacent the seals 14 formed when the packaging material is formed into bags containing product.

While fin seals are indicated at 14 in FIG. 1, any known seal structure can be used in forming and/or closing respective bags made with packaging structures of the invention.

Coated sheet 524 can be made by the following exemplary process. A first primer barrier layer of polyvinyl alcohol and acrylic polymer is first applied to a surface e.g. 534 of a selected suitable bleached kraft substrate web in an amount of about 5 pounds per 3000 square feet and dried in-line in an oven. A second finish barrier layer of polyvinyl alcohol is then overcoated in-line over the primer barrier layer at a coating weight of about 2.5 pounds per 3000 square feet and dried in-line in an oven. The substrate with the 2 barrier coatings is then soft calendared in line, using a combination of one metal-faced roll and one (soft) polymer-faced roll. The metal-faced roll is disposed against the uncoated surface of the substrate whereby the metal-faced roll is disposed against the second/finish barrier coating.

By "in-line" is meant that the process step is accomplished during a continuity of the processing of a generally continuous length web of material being processed.

A single application of the above "Print Coating for Bleached Kraft Substrate" is then applied in-line to the opposing surface e.g. 532 of the substrate as e.g. print coating 536 and dried in an oven in line, thereby finishing preparation of the coated sheet for the addition of print layer 540. All the above steps can be performed in-line on a multi-pass coater, thereby to provide cost efficiencies to the process. The thus-coated sheet is then printed to add print layer 340, 440, 540.

The thus-coated and printed sheet 324, 422, 524 is then joined with respective additional layers such as strength layer 326, 424, 426 as desired in order to develop the desired level of strength in the finished packaging material. In addition, a polyolefin layer 328, 428 can be joined into the structure as desired especially for providing a first barrier to migration of components of the goods to be packaged therein. Such barrier layer can be selected, both as to composition and to thickness, for its effectiveness for blocking transmission of one or more component, such as an oil, of the goods to be packaged therein.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A composite printable packaging paper, comprising:
    (a) a kraft paper substrate having a basis weight of about 25 pounds per 3000 square feet to about 70 pounds per 3000 square feet, fiber content of said kraft paper substrate comprising at least 80 percent by weight softwood fibers, said kraft paper substrate having a first surface on a first side thereof, and an opposing second surface on a second side thereof; and
    (b) in combination, about 4 pounds per 3000 square feet to about 20 pounds per 3000 square feet of flexible print coating on the first surface, said flexible print coating having an outer surface thereof disposed away from the first surface of said substrate, and comprising.
        (i) about 5 percent by weight to about 50 percent by weight clay
        (ii) about 10 percent by weight to about 50 percent by weight binder, said binder comprising about 30 percent by weight to 100 percent by weight acrylic polymer and optionally up to about 70 percent by weight polyvinyl alcohol copolymer wherein such polyvinyl alcohol copolymer is cross-linked, and
        (iii) about 7 percent by weight to about 30 percent by weight polymeric microsphere shells,
wherein the softwood fibers in said paper substrate are predominantly unbleached fibers, and wherein said flexible print coating further comprises at least 10 percent by weight titanium dioxide.

2. A composite printable packaging paper comprising:
    (a) a kraft paper substrate having a basis weight of about 25 pounds per 3000 square feet to about 70 pounds per 3000 square feet, fiber content of said kraft paper substrate comprising at least 80 percent by weight softwood fibers, said kraft paper substrate having a first surface on a first side thereof, and an opposing second surface on a second side thereof; and (b) in combination, about 4 pounds per 3000 square feet to about 20 pounds per 3000 square feet of flexible print coating on the first surface, said flexible print coating having an outer surface thereof disposed away from the first surface of said substrate, and comprising.
  (i) about 5 percent by weight to about 50 percent by weight clay,
  (ii) about 10 percent by weight to about 50 percent by weight binder, said binder comprising about 30 percent by weight to 100 percent by weight acrylic polymer and optionally up to about 70 percent by weight polyvinyl alcohol copolymer wherein such polyvinyl alcohol copolymer is cross-linked, and
  (iii) about 7 percent by weight to about 30 percent by weight polymeric microsphere shells, said composite printable packaging paper further comprising a barrier coating on, the second surface, said barrier coating comprising about 2 pounds per 3000 square feet to about 12 pounds per 300 square feet of a coating composition comprising alcohol, and from about 20 percent by weigth to about 60 percent by weight an acrylic polymer, said alcohol being cross-linked.

3. A composite printable packaging paper as in claim 2 wherein said barrier coating comprises about 5 pounds per 3000 square feet to about 10 pounds per 3000 square feet of said a coating composition comprising polyvinyl alcohol, and from 20 percent by weight to about 60 percent by weight of said an acrylic polymer.

4. A composite printable packaging paper as in claim 2 wherein said barrier coating comprises about 7 pounds per 3000 square feet to about 8 pounds per 300 square feet of said a coating composition comprising polyvinyl alcohol and from about 20 percent by weight to about 60 percent by weight of said acrylic polymer.

5. A composite printable packaging paper as in claim 2 wherein said kraft paper substrate is substantially free from halogenated carbon material operable as an oil barrier.

6. A composite printable packaging paper as in claim 2 wherein said kraft paper substrate has a basis weight of about 30 pounds per 3000 square feet to about 50 pounds per 3000 square feet and comprises substantially 100 percent softwood fibers, wherein said flexible print coating is a white coating and is present in an amount of about 6 pounds per 3000 square feet to about 12 pounds per 3000 square feet, wherein said binder comprises about 35 percent by weight to about 45 percent by weight of the composition of said flexible printable white coating, wherein said binder comprises said acrylic polymer in amount of at least 90 percent by weight, wherein said flexible printable white coating comprises said microsphere shells in an amount of about 15 percent by weight to about 25 percent by weight, wherein a portion of said microsphere shells proximate an outer surface of said flexible print coating have been physically deformed from such microsphere structure, said barrier coating being present in an amount of about 5 pounds per 3000 square feet to about 10 pounds per 3000 square feet, and said barrier coating comprising said acrylic polymer in an amount of about 45 percent by weight to about 55 percent by weight of said barrier coating.

7. A multiple layer flexible packaging structure comprising a composite printable packaging paper as in claim 2 as a first layer, and further comprising a second layer of a kraft paper having a basis weight such that the combined weight of the first and second layers is about 60 pounds per 3000 square feet to about 140 pounds per 3000 square feet, and further comprising a flexible polypropylene layer about 0.002 inch thick to about 0.015 inch thick, both said second layer and said polypropylene layer being disposed on the second side of said kraft paper substrate of said first layer, and further comprising a polyethylene barrier film between said kraft paper substrate and said second layer of kraft paper, and between said kraft paper substrate and said polypropylene layer.

8. A composite printable packaging paper as in claim 2, said polyvinyl alcohol barrier coating being effective to protect said flexible print coating from oil, up to at least a kit 7 test.

9. A composite printable packaging paper as in claim 2 wherein the softwood fibers in said kraft paper substrate are predominantly unbleached fibers, and wherein said flexible print coating further comprises at least 10 percent by weight titanium dioxide.

10. A composite printable packaging paper as in claim 2, wherein said polyvinyl alcohol is substantially fully hydrolyzed.

11. A multiple layer flexible packaging structure comprising a composite printable packaging paper as in claim 10 as a first layer, and further comprising a second layer of a kraft paper having a basis weight such that the combined weight of the first and second layers is about 60 pounds per 3000 square feet to about 140 pounds per 3000 square feet, and further comprising a flexible polypropylene layer about 0.002 inch thick to about 0.015 inch thick, both said second layer and said polypropylene layer being disposed on the second side of said kraft paper substrate of said first layer, and further comprising a polyethylene barrier film between said kraft paper substrate and said second layer of kraft paper, and between said kraft paper substrate and said polypropylene layer.

12. A composite printable packaging paper comprising:
  (a) a kraft paper substrate having a basis weight of about 25 pounds per 3000 square feet to about 70 pounds per 3000 square feet, fiber content of said kraft paper substrate comprising at least 80 percent by weight softwood fibers, said kraft paper substrate having a first surface on a first side thereof, and an opposing second surface on a second side thereof; and
  (b) in combination, about 4 pounds per 3000 square feet to about 20 pounds per 3000 square feet of flexible print coating on the first surface, said flexible print coating having an outer surface thereof disposed away from the first surface of said substrate, and comprising,
    (i) about 5 percent by weight to about 50 percent by weight clay,
    (ii) about 10 percent by weight to about 50 percent by weight binder, said binder comprising about 30 Percent by weight to 100 percent by weight acrylic polymer and optionally up to about 70 percent by weight polyvinyl alcohol copolymer wherein such polyvinyl alcohol copolymer is cross-linked, and
    (iii) about 7 percent by weight to about 30 percent by weight polymeric microsphere shells, said composite printable packaging paper further comprising a barrier coating comprising a polyethylene film overlying and covering the second surface, said polyethylene film being overcoated with about 1 pound per 3000 square feet to about 5 pound per 3000 square feet, of polyvinyl alcohol.

13. A multiple layer packaging structure comprising:
  (a) a first kraft paper substrate having a basis weight of about 25 pounds per 3000 square feet to about 70 pounds per 3000 square feet, fiber content of said kraft paper substrate layer comprising at least 80 percent by weight softwood fibers, said kraft paper substrate having a first surface on a first side thereof, and an opposing second surface on a second side thereof; and (b) in combination, about 4 pounds per 3000 square feet about 20 pounds per 3000 square feet of flexible print coating on the first surface, said flexible print coating having an outer surface thereof disposed away from the first surface of said substrate layer, and comprising, (i) about 5 percent by weight to about 50 percent by weight clay, (ii) about 10 percent by weight to about 50 percent by weight binder, said binder comprising about 30 percent by weight to 100 percent by weight acrylic polymer and optionally up to about 70 Percent by weight polyvinyl alcohol copolymer wherein such polyvinyl alcohol copolymer is cross-linked, and (iii) about 7 percent by weight to about 30 percent by weight polymeric microsphere shells, comprising a second of a kraft paper having a basic weight such that tho combined weight of the first and second layers is a bout 60 pounds per 3000 square foot to about 140 pounds per 3000 square feet, and further comprising a flexible polypropylene layer about 0.002 inch thick to about 0.015 inch thick, both said second kraft paper substrate layer and said polypropylene layer being disposed on the second side of said first paper substrate layer, further comprising a barrier coating between said first kraft paper substrate layer and said second kraft paper substrate layer, and between said first kraft paper substrate layer and said polypropylene layer.

14. A multiple layer flexible packaging structure comprising a composite printable packaging paper as in claim 13 wherein said binder comprises said acrylic polymer in amount of least 80 percent by weight.

15. A multiple layer flexible packaging structure comprising a composite printable packaging paper as in claim 13 wherein an portion of said microsphere shells proximate the outer surface of said flexible print coating have been physically deformed from such microsphere shell structure.

16. A composite printable packaging paper, comprising:

(a) a kraft paper substrate having a basis weight of about 25 pounds per 3000 square feet to about 70 pounds per 3000 square feet, fiber content of said kraft paper substrate comprising at least 80 percent by weight softwood fibers, said kraft paper substrate having a first surface on a first side thereof, and an opposing second surface on an opposing second side thereof;

(b) a print coating, coated onto and covering the first surface so as to make the first surface acceptably receptive to conventional printing inks; and (c) a barrier coating, coated onto and covering the second surface, of about 2 pounds per 3000 square feet to about 12 pounds per 3000 square feet of a coating comprising polyvinyl alcohol, and up to about 60 percent by weight of an acrylic polymer, said polyvinyl alcohol being cross-linked.

17. A composite printable packaging paper, comprising: said kraft paper substrate having a basis weight of about 30 pounds per 3000 square feet to about 50 pounds per 3000 square feet.

18. A multiple layer flexible packaging structure comprising a composite printable packaging paper as in claim 17 as a first layer, and further comprising a second layer of a kraft paper having a basis weight such that the combined weight of the first and second layers is about 60 pounds per 3000 square feet to about 140 pounds per 3000 square feet, and further comprising a flexible polypropylene layer about 0.002 inch thick to about 0.015 inch thick, both said second layer and said polypropylene layer being disposed on the second side of said kraft paper substrate of said first layer, with said barrier coating between said kraft paper substrate and said second layer of kraft paper, and between said kraft paper substrate and said polypropylene layer.

19. A composite printable packaging paper as claim 16 wherein said barrier coating comprising said acrylic polymer in an amount of about 45 percent by weight to about 55 percent by weight of said barrier coating.

20. A multiple layer flexible packaging structure comprising a printable packaging paper as in claim 19, said print coating comprising about 7 percent by weight to about 30 percent by weight polymeric microsphere shells.

21. A composite printable packaging paper as in claim 16, further comprising a polyethylene film between the second surface of said kraft paper substrate and said barrier coating.

22. A multiple layer flexible packaging structure comprising a printable packaging paper as in claim 21, said print coating comprising about 7 percent by weight to about 30 percent by weight polymeric microsphere shells.

23. A composite printable packaging paper as in claim 16 wherein the softwood fibers in said kraft paper substrate are predominantly unbleached fibers, and wherein said print coating further comprises at least 10 percent by weight titanium dioxide.

24. A multiple layer flexible packaging structure comprising a printable packaging paper as in claim 23, said print coating comprising about 7 percent by weight to about 30 percent by weight polymeric microsphere shells.

25. A multiple layer flexible packaging structure comprising a composite printable packaging paper as in claim 16 as a first layer, and further comprising a second layer of a kraft paper having a basis weight such that the combined weight of the first and second layers is about 60 pounds per 3000 square feet to about 140 pounds per 3000 square feet, and further comprising a flexible polypropylene layer about 0.002 inch thick to about 0.015 inch thick, both said second layer and said polypropylene layer being disposed on the second side of said kraft paper substrate of said first layer, with said barrier coating between said kraft paper substrate and said second layer of kraft paper, and between said kraft paper substrate and said polyproplene layer.

26. A multiple layer flexible packaging structure comprising a printable packaging paper as in claim 25, said print coating comprising about 7 percent by weight to about 30 percent by weight polymeric microsphere shells.

27. A composite printable packaging paper as in claim 16, said barrier coating being present in an amount of about 5 pounds per 3000 square feet to about 10 pounds per 3000 square feet.

28. A composite printable packaging paper as in claim 16 wherein said print coating is a white coating and comprises at least one material selected from the group consisting of white kaolin clay, calcium carbonate, and titanium dioxide.

29. A multiple flyer flexible packaging structure comprising a printable packaging paper as in claim 16 said barrier coating being effective to protect said print coating from oil-based substances when such oil-based substances are in contact with said composite packaging paper at an outer surface of said barrier coating.

30. A multiple layer flexible packaging structure comprising a printable packaging paper as in claim 16, said print coating comprising about 7 percent by weight to about 30 percent by weight polymeric microsphere shells.

* * * * *